(12) United States Patent
Carbune et al.

(10) Patent No.: US 12,079,954 B2
(45) Date of Patent: Sep. 3, 2024

(54) MODIFYING SENSOR DATA USING GENERATIVE ADVERSARIAL MODELS

(71) Applicant: Google LLC, Mountain View, CA (US)

(72) Inventors: Victor Carbune, Winterthur (CH); Daniel M. Keysers, Stallikon (CH); Thomas Deselaers, Zurich (CH)

(73) Assignee: Google LLC, Mountain View, CA (US)

( * ) Notice: Subject to any disclaimer, the term of this patent is extended or adjusted under 35 U.S.C. 154(b) by 287 days.

(21) Appl. No.: 17/603,362

(22) PCT Filed: Jun. 10, 2019

(86) PCT No.: PCT/US2019/036263
§ 371 (c)(1),
(2) Date: Oct. 13, 2021

(87) PCT Pub. No.: WO2020/251523
PCT Pub. Date: Dec. 17, 2020

(65) Prior Publication Data
US 2022/0198609 A1    Jun. 23, 2022

(51) Int. Cl.
*G06K 9/40*    (2006.01)
*G06T 3/4046*    (2024.01)
*G06T 5/00*    (2024.01)
*G06T 5/50*    (2006.01)

(52) U.S. Cl.
CPC .............. *G06T 3/4046* (2013.01); *G06T 5/50* (2013.01); *G06T 2207/20081* (2013.01); *G06T 2207/20084* (2013.01)

(58) Field of Classification Search
CPC .... G06N 3/0475; G06T 3/4046; G06T 3/4053
See application file for complete search history.

(56) References Cited

U.S. PATENT DOCUMENTS

| 6,293,465 B1 * | 9/2001 | Heller ............... | G06K 7/10722 |
| | | | 348/E5.042 |
| 6,819,358 B1 | 11/2004 | Kagle et al. | |
| 2018/0075581 A1 | 3/2018 | Shi et al. | |

(Continued)

OTHER PUBLICATIONS

Isola et al., "Image-to-image translation with conditional adversarial networks" arXiv, 2016, 16 pages.

(Continued)

*Primary Examiner* — Brian Werner
(74) *Attorney, Agent, or Firm* — Fish & Richardson P.C.

(57) ABSTRACT

Methods, systems, and apparatus, including computer programs encoded on a computer storage medium, that use generative adversarial models to increase the quality of sensor data generated by a first environmental sensor to resemble the quality of sensor data generated by another sensor having a higher quality than the first environmental sensor. A set of first and second training data generated by a first environmental sensor having a first quality and a second sensor having a target quality, respectively, is received. A generative adversarial mode is trained, using the set of first training data and the set of second training data, to modify sensor data from the first environmental sensor by reducing a difference in quality between the sensor data generated by the first environmental sensor and sensor data generated by the target environmental sensor.

20 Claims, 5 Drawing Sheets

(56) References Cited

U.S. PATENT DOCUMENTS

2018/0189607 A1* 7/2018 Cocias ................ G06F 18/28
2018/0341836 A1 11/2018 Lim et al.
2019/0236759 A1* 8/2019 Lai ...................... G06T 3/60
2019/0333198 A1* 10/2019 Wang .................. G06T 5/50
2019/0370608 A1* 12/2019 Lee ..................... G06N 3/084
2020/0065945 A1* 2/2020 Schafer ............... G06T 5/50

OTHER PUBLICATIONS

PCT International Preliminary Report on Patentability in International Application No. PCT/US2019/036263, dated Dec. 23, 2021, 9 pages.
PCT International Search Report and Written Opinion in International Application No. PCT/US2019/036263, dated Nov. 14, 2019, 16 pages.

* cited by examiner

MODIFYING SENSOR DATA USING GENERATIVE ADVERSARIAL MODELS

CROSS-REFERENCE TO RELATED APPLICATION

This application is a National Stage Application under 35 U.S.C. § 371 and claims the benefit of International Application No. PCT/US2019/036263, filed Jun. 10, 2019. The disclosure of the foregoing application is hereby incorporated by reference in its entirety.

BACKGROUND

This specification relates to using generative adversarial models to increase the quality of sensor data generated by a first environmental sensor to resemble the quality of sensor data generated by another sensor having a higher quality than the first environmental sensor.

Environmental sensors (e.g., audio sensors, video sensors, and image sensors) come in different resolutions. As a result, some environmental sensors have much higher resolution than other sensors. For example, image sensors in modern mirrorless cameras generally have a higher resolution than image sensors in compact, point-and-shoot cameras. Devices with higher resolution environmental sensors generally generate higher resolution media in comparison to devices with lower resolution environmental sensors.

SUMMARY

In general, one innovative aspect of the subject matter described in this specification can be embodied in methods that can include the operations of: receiving a set of first training data generated by a first environmental sensor having a first quality, the first set of training data being of the first quality; receiving a set of second training data generated by a target environmental sensor having a target quality, the set of second training data being of the target quality and the first quality is different from the target quality; training, using the set of first training data and the set of second training data, a generative adversarial model to modify sensor data from the first environmental sensor by reducing a difference in quality between the sensor data generated by the first environmental sensor and sensor data generated by the target environmental sensor, wherein the training includes: obtaining, from a generator model of the generative adversarial model and using one or more data items in the set of first training data, a set of modified sensor data having a quality different from the first quality; inputting a set of data items comprising one or more data items in the set of second training sensor data and the set of modified first sensor data into a discriminator model of the generative adversarial model; determining, by the discriminator model and using the set of data items, whether each data item in the set of data items has the target quality; adjusting the discriminator model and the generator model when the discriminator model determines that a data item in the set of data items that was generated by the generator model has the target quality; and adjusting the discriminator model and the generator model when the discriminator model determines that a data item in the set of data items that was generated by the generator model does not have the target quality. Other embodiments of this aspect include corresponding systems, devices, apparatus, and computer programs configured to perform the actions of the methods. The computer programs (e.g., instructions) can be encoded on computer storage devices. These and other embodiments can each optionally include one or more of the following features.

In some implementations, each of the first environmental sensor and the second environmental sensor can acquire one of sounds, images, or video.

In some implementations, methods can include the operations of: receiving a first sensor data generated by the first environmental sensor having the first quality; inputting the first sensor data into the generative adversarial model; and obtaining, using the generator model of the generative adversarial model, a modified sensor data based on the input first sensor data.

In some implementations, methods can include receiving a first sensor data generated by the first environmental sensor having the first quality; inputting information about the first environmental sensor to a known defects data structure that stores the known defects for different environmental sensors; obtaining, from the known defects data structure, known defects for the first environmental sensor; adjusting the first sensor data based on the known defects for the first environmental sensor; inputting the adjusted first sensor data into the generative adversarial model; and obtaining, using the generator model of the generative adversarial model, a modified sensor data based on the adjusted first sensor data.

Particular embodiments of the subject matter described in this specification can be implemented to realize one or more of the following advantages. The innovations described in this specification enable using a low resolution environmental sensor to generate media that has a higher resolution than the resolution of the environmental sensor. Conventional environmental sensors generate sensor data that is of the same (or lower) resolution as the resolution of these sensors. Thus, there is a direct correlation between an environmental sensor's resolution and the resolution of the sensor data acquired by the sensor. The innovations described in this specification use generative adversarial models (which may also be referred to as generative adversarial networks) to modify the sensor data generated by an environmental sensor to resemble sensor data generated by a different environmental sensor with a higher resolution. As a result, devices with low cost sensors that have low resolutions can be modified (as described in this specification) to generate high resolution media that is conventionally only generated by the more costly, higher resolution sensors. This allows, for example, a user to experience high resolution media content, despite that content being captured with a low resolution sensor. Furthermore, it allows devices with lower cost and lower resolution sensors to compete in the marketplace with devices that use more expensive sensors with higher resolutions.

The innovations described in this specification can be used to generate high resolution media despite using lower resolution sensors that are necessitated by the environment in which these sensors are deployed. For example, some outdoor applications can only accommodate low resolution sensors that are suitable for tough environments (e.g., outdoors, high turbulence, etc.). As a result, the media generated by the sensors used in these applications is generally of lower quality in comparison with media generated by higher resolution sensors. The innovations described in this specification enable modifying the sensor data received by low resolution sensors to generate high resolution media similar to the media generated by higher resolution sensors.

Moreover, the innovations described in this specification enable using defective sensors to generate high resolution images. Conventional environmental sensors may have certain defects (that exist or arise during use of the sensor). For example, an image sensor may have defects like chromatic aberration or stuck pixels that may arise during use of these sensors. In such instances, the image sensor can either be repaired, which can be costly due to the complexity of image sensors, or be replaced with another sensor. The innovations described in this specification can help avoid such costly repair or replacement of defective environmental sensors. The innovations described in this specification accomplish this by using a combination of a known defects data structure and a generative adversarial model (as further described below) to modify the sensor data generated by defective sensor to resemble sensor data acquired by a proper functioning sensor.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification relates to using models, such as generative adversarial models, to increase the quality of sensor data generated by a first environmental sensor to resemble the quality of sensor data generated by another sensor having a higher quality than the first environmental sensor. As used in this specification, a quality of sensor data can refer to a measured aspect of the sensor data, which can include, among others, the sensor data's resolution, error rate, fidelity, and signal-to-noise ratio. While the example implementations described below use generative adversarial models, other machine learning systems can also be used. Moreover, while the example implementations are described below using resolution as the sensor data quality metric, other sensor data quality metrics (e.g., error rate, fidelity, and signal-to-noise ratio) can be used in implementing the operations and structures described in this specification.

Generative adversarial models are neural network models that use two competing neural network models to generate data with the same characteristics as a set of training data. The two competing neural network models are a generator model and a discriminator model. The objective of the generator model is to generate data that resembles the training data, and the objective of the discriminator model is to discriminate between real data (i.e., training data) and fake data (i.e., generated data).

Together, the discriminator and generator models attempt to optimize a min-max objective function. The discriminator model attempts to maximize the objective by correctly identifying training data as real and generated data as fake. On the other hand, the generator model attempts to minimize the objective by generating fake data that the discriminator incorrectly classifies as real data.

Conventional generative adversarial models have been trained to generate, for example, images that resemble images in a set of training data. In such models, the generator model of the generative adversarial model generates an image using a random data distribution. The generated image is input to the discriminator model along with training images that represents the actual or real data that the generative adversarial model is trying to mimic. The discriminator model classifies the input image as real (i.e., the image is from the training data set) or fake (i.e., the image is not from the training data set). In some instances, the discriminator model may correctly classify the input image as real and in other instances, the discriminator model incorrectly classifies the input data as real. In both scenarios, the classification of the discriminator model (whether correct or incorrect) is used to update the generator model and discriminator model. This process is repeated iteratively when training the generative adversarial model.

As further described in this specification, generative adversarial models can be trained using the novel approach described below to modify sensor data generated by a first environmental sensor having a first quality (e.g. resolution) to resemble sensor data generated by a target environmental sensor having a target quality (e.g., target resolution). The target quality is different from the first quality, and is typically a higher quality than the first quality.

Figure 1:
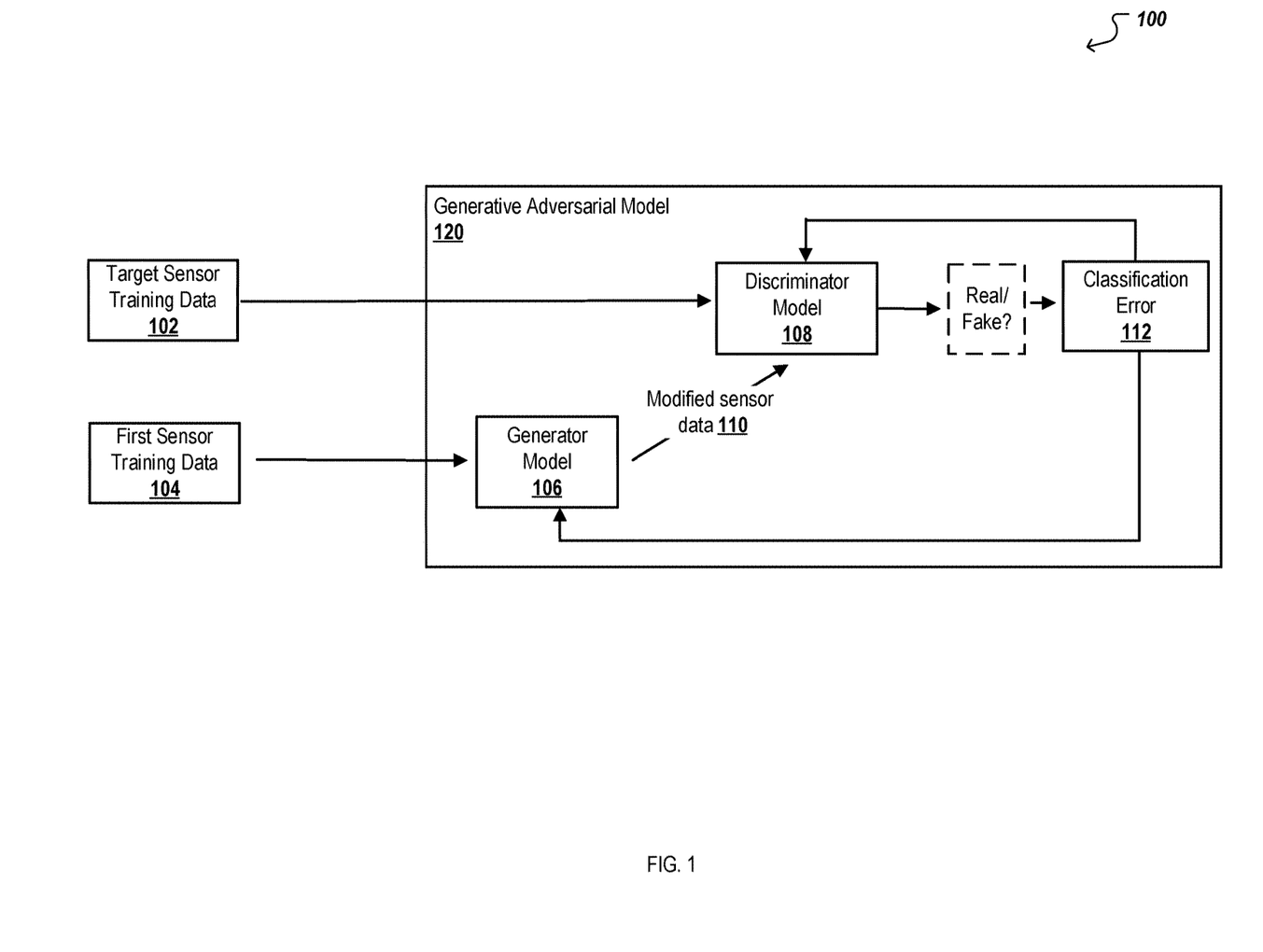
FIG. 1 is a block diagram of an example environment for training a generative adversarial model.

FIG. 1 is a block diagram of an example environment 100 for training such a generative adversarial model.

The generative adversarial model 120 shown in FIG. 1 is trained using two sets of training data. The first set of training data is generated using a first environmental sensor, which has a first resolution. Each data item in the first set of training data has a first resolution. The second set of training data is generated using a target sensor (different from the first environment sensor), which has a target resolution (different from the first resolution). Each data item in the second set of training data has a target resolution. In some implementations, each data item in the first set of training data has a corresponding data in the second set of training data that captures the same environmental stimulus. For example, if the first set of training data includes 10 images of 10 different stimuli, the second set of training data also includes 10 images of the same stimuli.

As used in this specification, an environmental sensor is a sensor that acquires a particular type of media, such as a, e.g., video, audio, or images, in response to an environmental stimulus. Examples of environmental sensors include one or more of: image sensors; video sensors; audio sensors; location/position sensors; micro-electromechanical systems; motion sensors; accelerometers; magnetometers; and/or gyroscopes. It will be appreciated that other examples of environmental sensors can also be used.

The object is to develop a model that can be deployed with devices that use the first sensor, and by use of the model, modify the data generated by the first sensor so that it has the qualities of data that would have been generated had the target sensor been used.

The operations of the generative adversarial model 120 and its components, as shown in the example environment 100, are described below with reference to FIG. 2.

Figure 2:
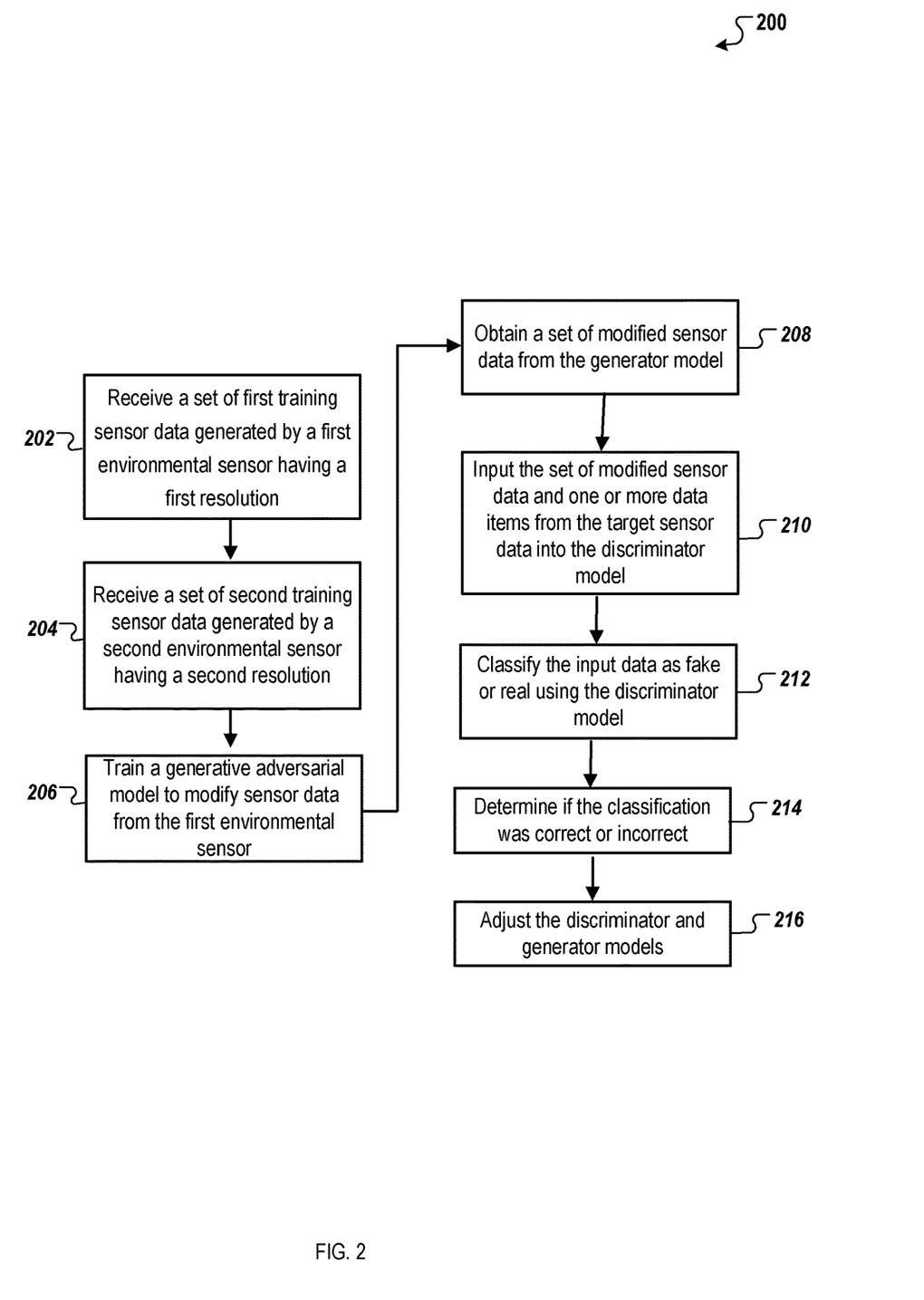
FIG. 2 is a flow diagram of an example process for training a generative adversarial model.

FIG. 2 is a flow diagram of an example process 200 for training the generative adversarial model 120 of FIG. 1. Operations of the process 200 are described below for illustration purposes only. Operations of the process 200 can be performed by any appropriate device or system, e.g., any appropriate data processing apparatus. Operations of the process 200 can also be implemented as instructions stored on a non-transitory computer readable medium. Execution of the instructions cause one or more data processing apparatus to perform operations of the process 200.

The process 200 receives a set of first training data generated by a first environmental sensor having a first resolution (at 202). In some implementations, the process 200 can receive the first set of training data from a content source on a network (e.g., LAN, WAN, the Internet, or combination thereof) or from a device that includes the first environmental sensor. Upon receiving this first set of training data, the process 200 can store this data in a first sensor training data storage device 104.

The process 200 receives a set of second training data generated by a target sensor having a target resolution (at 204). In some implementations, the process 200 can receive the second set of training data from a content source on a network (e.g., LAN, WAN, the Internet, or combination thereof) or from a device that includes the target environmental sensor. Upon receiving this second set of training data, the process 200 can store this data in a target sensor training data storage device 102. In some implementations, the second set of training data includes data items that capture or record the same stimuli that is also captured by the data items included in the first set of training data.

The process 200 trains the generative adversarial model 120 to modify sensor data from the first environmental sensor to resemble sensor data from the target environmental sensor (at 206). In particular, the process 200 trains the generative adversarial network to modify input sensor data from the first environmental sensor by reducing a difference in quality of the sensor data (e.g., resolution) between the input sensor data and sensor data generated by the target environmental sensor. The process 200 trains the generative adversarial network using the sub-operations 208-216, which are described below. Operations 208-216 are described, for illustration, using resolution as the quality of the sensor data. It will be appreciated that these operations may also be performed using any other quality of sensor data.

The process 200 obtains a set of modified sensor data from the generator model 106 of the generative adversarial network 120 (at 208). In some implementations, the process 200 inputs one or more data items from the first sensor data storage device 104 into the generator model 106. In some implementations, prior to inputting data items from the first sensor data storage device 104 to the generator model 106, the process 200 inputs the data item into an upscaler, that upscales the sensor data for that data item. Then, the process 200 inputs the upscaled data items into the generator model. Using this input data and the corresponding data item (that captures the same stimuli) in the target sensor data 102, the generator model 106 generates a set of modified sensor data 110 with a resolution that is different from the first resolution and that resembles the resolution of the data item from the target sensor data 102.

The process 200 inputs the set of modified sensor data 110 and one or more data items from the target sensor data 102 into the discriminator model 108 (at 210).

The process 200 classifies the input data (i.e., the data input into the discriminator model in operation 210) as fake or real using the discriminator model (at 212). In some implementation, using the data items input into the discriminator model 108 (at operation 210), the discriminator model 108 determines whether each input data item has a target resolution (i.e., real data). If the discriminator model 108 determines that an input data item has a target resolution, it classifies the input data item as real. On the other hand, if the discriminator model 108 determines that the input data item does not have a target resolution, it classifies the input data item as fake.

The process 200 determines whether the classification by the discriminator model (at operation 212) was correct (at 214). In some implementations, a classification error engine 112 determines whether the classification of the discriminator model 108 was correct. Each data item input into the discriminator model 108 may have a tag that identifies the source of the input data, e.g., an identifier that specifies whether the data item was provided by the target sensor data storage device 102 or by the generator model 106. Using this tag, the classification engine 112 identifies the source of the input data item.

If the discriminator model 106 classifies data that was retrieved from the target sensor data storage device 108 as real, the classification error engine 112 concludes that the discriminator 108 was correct. And, if the discriminator model 108 classifies data that was retrieved from the generator model 106 as fake, the classification error engine 112 concludes that the discriminator 106 was correct. In some implementations, the classification error engine 112 can use the classification to generate a classification error score ranging from zero to one, where zero represents that the classification by the discriminator model 108 was incorrect and one represents that the classification by the discriminator model 108 was correct.

On the other hand, if the discriminator model 108 classifies data that was received from the generator model 106 as real, the classification error engine 112 concludes that the discriminator 106 was incorrect. In some implementations, the classification error engine 112 can generate a classification score ranging from zero to one, where zero represents that the classification by the discriminator model 108 was incorrect and one represents that the classification by the discriminator model 108 was correct.

The process 200 adjusts the generator and discriminator models (at 216). In both instances—i.e., when the classification error engine 112 determines that the discriminator model 108 correctly classified the input data from the generator model 106 as fake and classification error engine 112 determines that the discriminator model 108 incorrectly classified the input data from the generator model as real—the process 200 adjusts the discriminator and generator models. In some implementations, the classification error score generated by the classification error engine 112 is provided to the discriminator model 108 and the generator model 106. Both models uses this classification error to adjust their respective models. The generator model 106 is adjusted based on the classification error to subsequently generate modified sensor data from the first sensor data 104 that further reduces the difference in resolution between the sensor data generated by the first environmental sensor and sensor data generated by the target environmental sensor. The discriminator model 108 is adjusted based on the classification error to subsequently be able to distinguish modified sensor data generated by the generator model 106 from the target sensor data generated by the target environmental sensor.

To train the generative adversarial model 120, the operations 208-216 can be performed iteratively a threshold number of times. Alternatively, the training of the generative adversarial model 120 can continue (i.e., which results in iterative performance of operations 208-216) until the discriminator model 108 identifies modified sensor data as real data. Alternatively, the training of the generative adversarial model 120 can continue until both the discriminator model 108 and the generator model 106 have processed all the data in the first sensor training data storage device 104 and the target sensor training data storage device 102.

Figure 3:
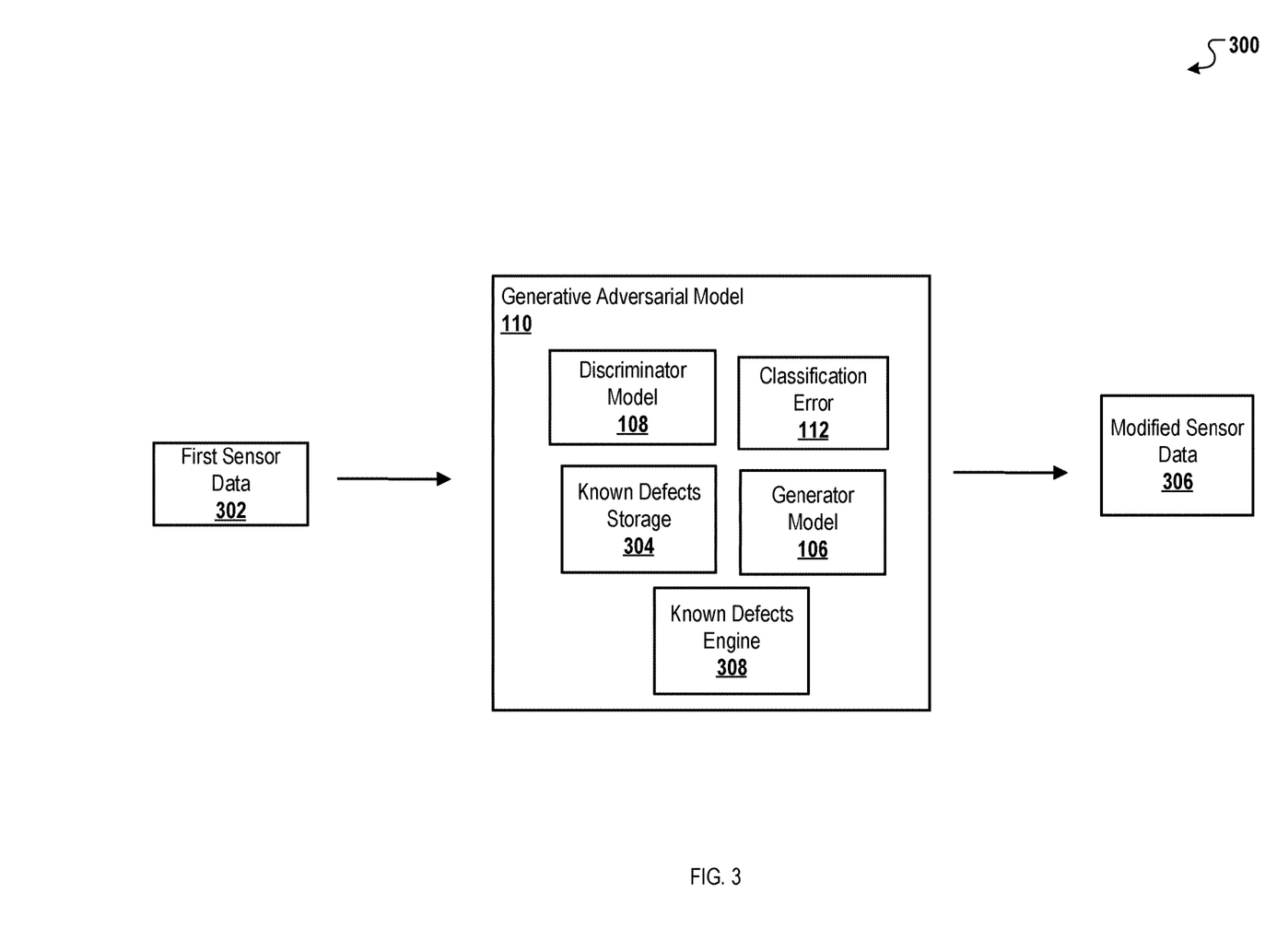
FIG. 3 is a block diagram of an example environment in which a generative adversarial model is used to modify sensor data received from a first environmental sensor.

FIG. 3 is a block diagram of an example environment 300 in which the generative adversarial model 120 is used to modify sensor data received from the first environmental sensor.

As shown in FIG. 3, a first sensor data 302, which is generated by the first environmental sensor, is modified using the generative adversarial model 120 (as trained using the operations and components described with reference to FIGS. 1 and 2) to generate the modified sensor data 306. The trained generative adversarial model 120 of FIG. 3 can be implemented in, for example, a device that includes the first environmental sensor (e.g., a camera). In such implementations, the first sensor data 302 is generated by the first environmental sensor of the device and the device generates the modified sensor data 306 using the generative adversarial model 120 stored on the device. Alternatively, the trained generative adversarial model 120 can be implemented in a computer system separate from the device, which includes the first environmental sensor that generates the first sensor data 302. In such implementations, the first sensor data 302 can be provided by the device, e.g., over a network (e.g., LAN, WAN, the Internet, or a combination thereof), to the computer system where the generative adversarial model 120 is stored. The computer system can then generate the modified sensor data 306 using the generative adversarial model 120 and then provide the modified sensor data 306 to the device. The modified sensor data 306 may be used in one or more applications on the device to provide one or more services to a user. For example, where the environmental sensors are image, video and/or audio sensors, modified image, video and/or audio media may be output from the device, for example, via a screen and/or speakers connected to the device. In other examples, the modified sensor data 306 may be used to determine an estimate of the location and/or orientation of the device.

The operations of the components of FIG. 3 that generate the modified sensor data 306 are shown and described with reference to FIG. 4.

Figure 4:
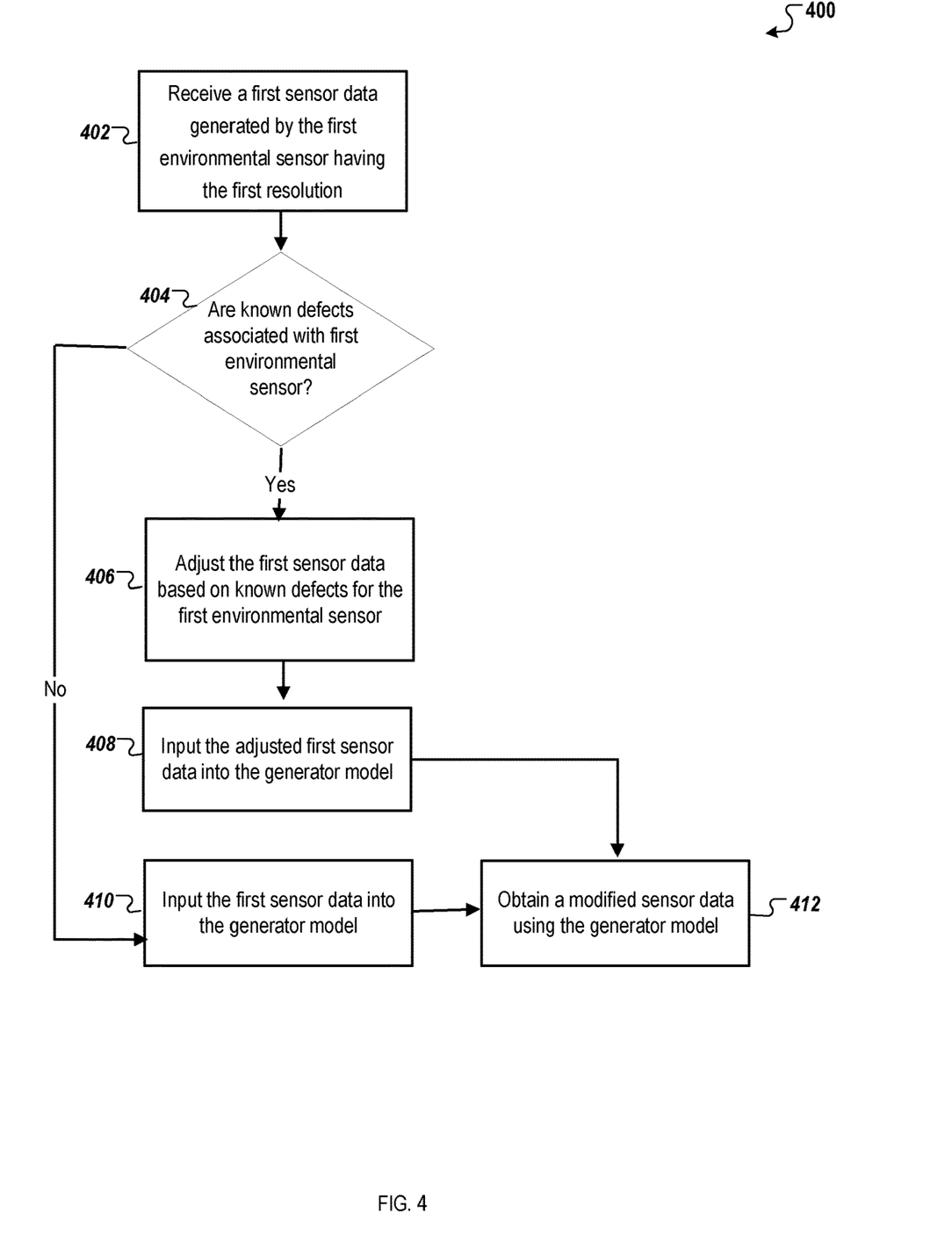
FIG. 4 is a flow diagram of an example process that uses a generative adversarial model to modify sensor data received from a first environmental sensor.

FIG. 4 is a flow diagram of an example process 400 that uses the generative adversarial model to modify sensor data generated by the first environmental sensor. For illustration, the process 400 is described as being performed on a user device (e.g., a computer, mobile device, camera) on which the trained generative adversarial model 110 is stored. Operations of the process 400 can be performed by any appropriate device or system, e.g., any appropriate data processing apparatus. Operations of the process 400 can also be implemented as instructions stored on a non-transitory computer readable medium. Execution of the instructions cause one or more data processing apparatus to perform operations of the process 400.

The process 400 receives a first sensor data generated by the first environmental sensor having the first resolution (at 402). In some implementations, a first environmental sensor (e.g., an image sensor) of a user device (e.g., a camera, mobile phone) generates a first sensor data 302 (e.g., image sensor data) of a particular resolution (e.g., the same resolution as the maximum resolution of the image sensor) in response to an environmental stimulus. The first environmental sensor of the device sends the first image sensor data 302 to the generative adversarial model 120 stored on the user device. As a result, the generative adversarial model 120 receives the first sensor data 302.

The process 400 determines known defects that are associated with the first environmental sensor (at 404). In some implementations, the generative adversarial model 120 can include a known defects storage device 304. The known defects storage device 304 can store the known defects (e.g., stuck pixels, chromatic aberration) for different environmental sensors. In some implementations, the known defects storage device 304 can store a known defects data structure that identifies different environmental sensors (e.g., using a sensor identifier for the sensor), the corresponding defects known for that sensor, and steps to execute to fix that defect. In other implementations, the known defects storage device 304 can store a known defects data structure that identifies different environmental sensors (e.g., using a sensor identifier for the sensor) and the corresponding defects known for that sensor. The known defects engine 308 uses the sensor identifier for the first environmental sensor to identify defects, if any, for the first environmental sensor from the known defects data structure.

If the known defects engine 308 identifies defects for the first environmental sensor from the known defects data structure, the known defects engine 308 adjusts the first sensor data 302 to correct the identified defects by identifying and executing the corresponding steps for correcting the defects (as stored in the known defects data structure) (at 406). In some implementations, the known defects engine 308 obtains, from the known defects data structure, the necessary steps to fix the defect and then executes these steps to correct the known defects. In some implementations, the known defects engine 308 uses the identified defect to identify a separate generative adversarial model that has been trained to correct that defect. In such implementations, this separate generative adversarial model is trained using a set of sensor data from the first sensor that has the identified defect and a set of sensor data from the first sensor that does not have that defect. Such a generative adversarial model can be trained using these sets of data to reduce the defect in the sensor data, using the same process as described above with reference to the operations shown and described with reference to FIG. 2. Thus, upon inputting the defective first sensor data into such a generative adversarial model, the model generates an adjusted first sensor data that reduces or corrects the defect in the sensor data. It will be appreciated that a separate generative adversarial model may be trained and implemented for each defect. It will be further appreciated that a single generative adversarial model may be trained and implemented to correct all known defects for input sensor data.

After the known defects engine 308 generates the adjusted first sensor data, the known defects engine 308 inputs this adjusted first sensor data into the generator model 106 of the generative adversarial model 120 (at 408).

If, however, the known defects engine 308 does not identify any defects for the first environmental sensor in the known defects data structure, the known defects engine 308 inputs the first sensor data into the generator model 106 of the generative adversarial model 120 (at 410).

Based on the input first sensor data 302 or the adjusted first sensor data, the generator model 106 generates a modified sensor data 306 (at 412). Because the generator model 106 has been trained using the operations described above with reference to FIGS. 1 and 2, the resolution of the modified sensor data 306 is different from the first resolution and closer to (if not substantially the same as) the target resolution.

Figure 5:
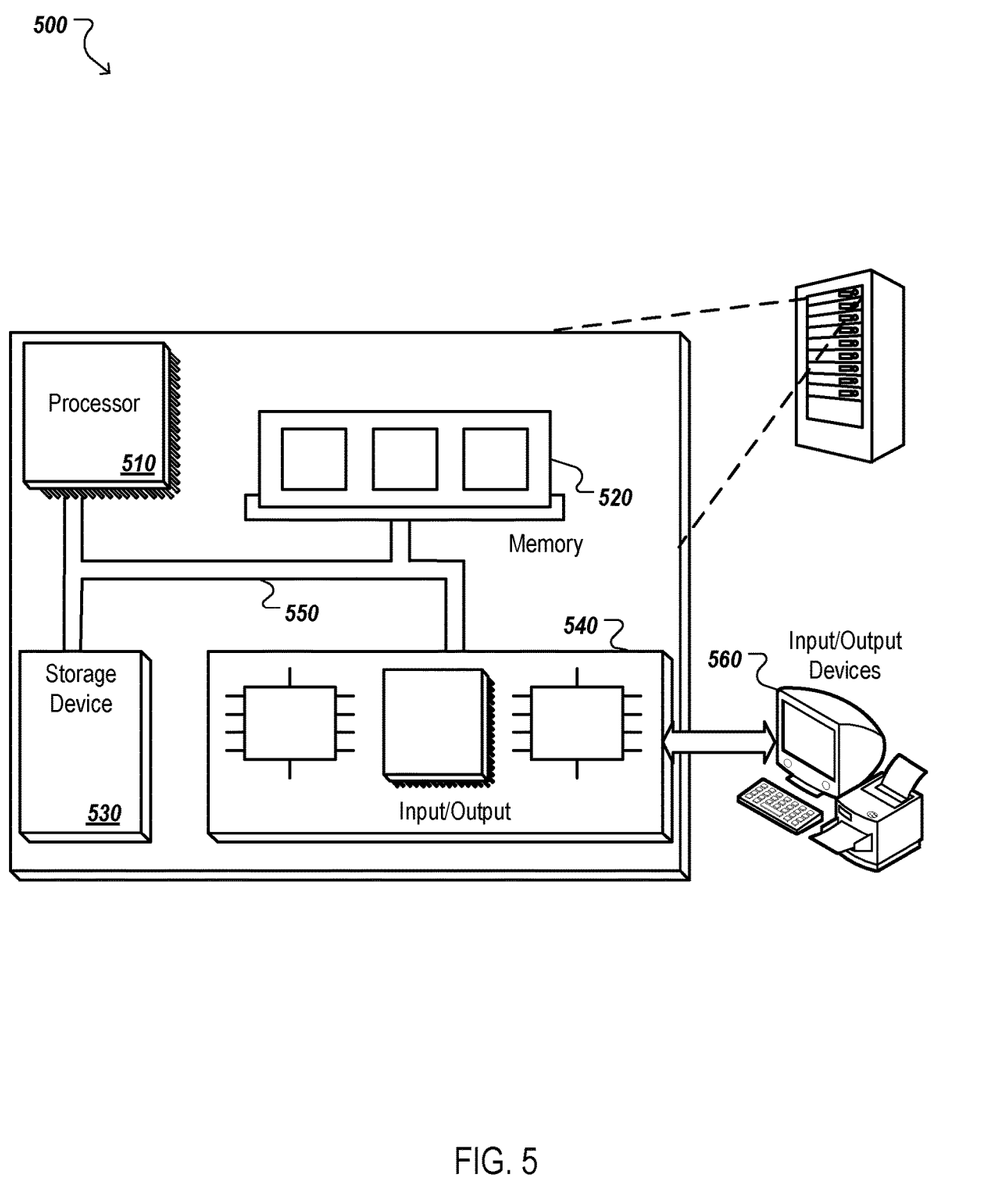
FIG. 5 is a block diagram of an example computer system.

FIG. 5 is block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In some implementations, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In some implementations, the memory 520 is a volatile memory unit. In another implementation, the memory 520 is a non-volatile memory unit.

The storage device 530 is capable of providing mass storage for the system 500. In some implementations, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In some implementations, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    receiving a set of first training data generated by a first environmental sensor having a first quality, the first set of training data being of the first quality and comprising one or more defects;
    receiving a set of second training data generated by a target environmental sensor having a target quality higher than the first quality, the set of second training data being of the target quality and not having the one or more defects in the first set of training data, wherein the target environmental sensor generates data of a same type as the first environmental sensor;
    training, using the set of first training data and the set of second training data, a generative adversarial model to modify sensor data from the first environmental sensor by reducing a difference in quality associated with the one or more defects of the first set of training data between the sensor data generated by the first environmental sensor and sensor data generated by the target environmental sensor, wherein the training includes:
        obtaining, from a generator model of the generative adversarial model and using one or more data items in the set of first training data, a set of modified sensor data having a quality different from the first quality;
        inputting a set of data items comprising one or more data items in the set of second training data and the set of modified first sensor data into a discriminator model of the generative adversarial model;
        determining, by the discriminator model and using the set of data items, a classification for each of the data items, the classification indicative of whether a data item originates from the set of modified sensor data or the set of second training data;

determining a classification error based on the classifications for each data item; and adjusting, based on the classification error, the discriminator model and the generator model;

determining one or more known defects associated with an input environmental sensor;

providing an input set of sensor data generated by the input environmental sensor to the trained generative adversarial model, the input set of sensor data having the first quality and comprising the one or more known defects, wherein the input environmental sensor has a first resolution; and generating, by the trained generative adversarial model, modified input sensor data having the target quality and not having the one or more known defects, wherein the target quality is a higher resolution than the first resolution of the input environmental sensor.

2. The computer-implemented method of claim 1, wherein each of the first environmental sensor and the target environmental sensor acquires one of sounds, images, or video.

3. The computer-implemented method of claim 1, further comprising:

receiving a first sensor data generated by the first environmental sensor having the first quality;

inputting the first sensor data into the generative adversarial model; and obtaining, using the generator model of the generative adversarial model, a modified sensor data based on the input first sensor data.

4. The computer-implemented method of claim 1, further comprising:

receiving a first sensor data generated by the first environmental sensor having the first quality;

inputting information about the first environmental sensor to a known defects data structure that stores the known defects for different environmental sensors;

obtaining, from the known defects data structure, known defects for the first environmental sensor;

adjusting the first sensor data based on the known defects for the first environmental sensor;

inputting the adjusted first sensor data into the generative adversarial model; and obtaining, using the generator model of the generative adversarial model, a modified sensor data based on the adjusted first sensor data.

5. A system comprising:

one or more memory devices storing instructions; and one or more data processing apparatus that are configured to interact with the one or more memory devices, and upon execution of the instructions, perform operations including:

receiving a set of first training data generated by a first environmental sensor having a first quality, the first set of training data being of the first quality and comprising one or more defects;

receiving a set of second training data generated by a target environmental sensor having a target quality higher than the first quality, the set of second training data being of the target quality and not having the one or more defects in the first set of training data, wherein the target environmental sensor generates data of a same type as the first environmental sensor;

training, using the set of first training data and the set of second training data, a generative adversarial model to modify sensor data from the first environmental sensor by reducing a difference in quality associated with the one or more defects of the first set of training data between the sensor data generated by the first environmental sensor and sensor data generated by the target environmental sensor, wherein the training includes:

obtaining, from a generator model of the generative adversarial model and using one or more data items in the set of first training data, a set of modified sensor data having a quality different from the first quality;

inputting a set of data items comprising one or more data items in the set of second training data and the set of modified first sensor data into a discriminator model of the generative adversarial model;

determining, by the discriminator model and using the set of data items, a classification for each of the data items, the classification indicative of whether a data item originates from the set of modified sensor data or the set of second training data;

determining a classification error based on the classifications for each data item; and adjusting, based on the classification error, the discriminator model and the generator model;

determining one or more known defects associated with an input environmental sensor;

providing an input set of sensor data generated by the input environmental sensor to the trained generative adversarial model, the input set of sensor data having the first quality and comprising the one or more known defects, wherein the input environmental sensor has a first resolution; and generating, by the trained generative adversarial model, modified input sensor data having the target quality and not having the one or more known defects, wherein the target quality is a higher resolution than the first resolution of the input environmental sensor.

6. The system of claim 5, wherein each of the first environmental sensor and the target environmental sensor acquires one of sounds, images, or video.

7. The system of claim 5, wherein the one or more data processing apparatus are configured to perform operations further comprising:

receiving a first sensor data generated by the first environmental sensor having the first quality;

inputting the first sensor data into the generative adversarial model; and obtaining, using the generator model of the generative adversarial model, a modified sensor data based on the input first sensor data.

8. The system of claim 5, wherein the one or more data processing apparatus are configured to perform operations further comprising:

receiving a first sensor data generated by the first environmental sensor having the first quality;

inputting information about the first environmental sensor to a known defects data structure that stores the known defects for different environmental sensors;

obtaining, from the known defects data structure, known defects for the first environmental sensor;

adjusting the first sensor data based on the known defects for the first environmental sensor;

inputting the adjusted first sensor data into the generative adversarial model; and obtaining, using the generator model of the generative adversarial model, a modified sensor data based on the adjusted first sensor data.

9. A non-transitory computer readable medium storing instructions that, when executed by one or more data processing apparatus, cause the one or more data processing apparatus to perform operations comprising:
receiving a set of first training data generated by a first environmental sensor having a first quality, the first set of training data being of the first quality and comprising one or more defects;
receiving a set of second training data generated by a target environmental sensor having a target quality higher than the first quality, the set of second training data being of the target quality and not having the one or more defects in the first set of training data, wherein the target environmental sensor generates data of a same type as the first environmental sensor;
training, using the set of first training data and the set of second training data, a generative adversarial model to modify sensor data from the first environmental sensor by reducing a difference in quality associated with the one or more defects of the first set of training data between the sensor data generated by the first environmental sensor and sensor data generated by the target environmental sensor, wherein the training includes:
obtaining, from a generator model of the generative adversarial model and using one or more data items in the set of first training data, a set of modified sensor data having a quality different from the first quality;
inputting a set of data items comprising one or more data items in the set of second training data and the set of modified first sensor data into a discriminator model of the generative adversarial model;
determining, by the discriminator model and using the set of data items, a classification for each of the data items, the classification indicative of whether a data item originates from the set of modified sensor data or the set of second training data;
determining a classification error based on the classifications for each data item; and
adjusting, based on the classification error, the discriminator model and the generator model;
determining one or more known defects associated with an input environmental sensor;
providing an input set of sensor data generated by the input environmental sensor to the trained generative adversarial model, the input set of sensor data having the first quality and comprising the one or more known defects, wherein the input environmental sensor has a first resolution; and
generating, by the trained generative adversarial model, modified input sensor data having the target quality and not having the one or more known defects, wherein the target quality is a higher resolution than the first resolution of the input environmental sensor.

10. The non-transitory computer readable medium of claim 9, wherein each of the first environmental sensor and the target environmental sensor acquires one of sounds, images, or video.

11. The non-transitory computer readable medium of claim 9, wherein the operations further comprise:
receiving a first sensor data generated by the first environmental sensor having the first quality;
inputting the first sensor data into the generative adversarial model; and
obtaining, using the generator model of the generative adversarial model, a modified sensor data based on the input first sensor data.

12. The non-transitory computer readable medium of claim 9, wherein the operations further comprise:
receiving a first sensor data generated by the first environmental sensor having the first quality;
inputting information about the first environmental sensor to a known defects data structure that stores the known defects for different environmental sensors;
obtaining, from the known defects data structure, known defects for the first environmental sensor;
adjusting the first sensor data based on the known defects for the first environmental sensor;
inputting the adjusted first sensor data into the generative adversarial model; and
obtaining, using the generator model of the generative adversarial model, a modified sensor data based on the adjusted first sensor data.

13. The computer-implemented method of claim 1, comprising:
identifying, using the one or more defects of the first set of training data, the generative adversarial model from a plurality of generative adversarial models, each generative adversarial model from the plurality of generative adversarial models being trained to correct a respective defect from the one or more defects in a set of sensor data.

14. The computer-implemented method of claim 13, further comprising:
inputting a first sensor data generated by the first environmental sensor having the first quality into the generative adversarial model, wherein the first sensor data comprises a particular defect corresponding to the identified generative adversarial model; and
obtaining, using a generator model of the identified generative adversarial model, a modified sensor data based on the input first sensor data, wherein the modified sensor data generated from the generator model comprises at least one correction of the particular defect from the input first sensor data.

15. The computer-implemented method of claim 1, wherein the set of modified sensor data is of a same type as the set of first training data.

16. The system of claim 5, the operations further comprising:
identifying, using the one or more defects of the first set of training data, the generative adversarial model from a plurality of generative adversarial models, each generative adversarial model from the plurality of generative adversarial models being trained to correct a respective defect from the one or more defects in a set of sensor data.

17. The system of claim 16, the operations further comprising:
inputting a first sensor data generated by the first environmental sensor having the first quality into the generative adversarial model, wherein the first sensor data comprises a particular defect corresponding to the identified generative adversarial model; and
obtaining, using a generator model of the identified generative adversarial model, a modified sensor data based on the input first sensor data, wherein the modified sensor data generated from the generator model comprises at least one correction of the particular defect from the input first sensor data.

18. The system of claim 5, wherein the set of modified sensor data is of a same type as the set of first training data.

19. The non-transitory computer readable medium of claim 9, the operations further comprising:
- identifying, using the one or more defects of the first set of training data, the generative adversarial model from a plurality of generative adversarial models, each generative adversarial model from the plurality of generative adversarial models being trained to correct a respective defect from the one or more defects in a set of sensor data.

20. The non-transitory computer readable medium of claim 19, the operations further comprising:
- inputting a first sensor data generated by the first environmental sensor having the first quality into the generative adversarial model, wherein the first sensor data comprises a particular defect corresponding to the identified generative adversarial model; and
- obtaining, using a generator model of the identified generative adversarial model, a modified sensor data based on the input first sensor data, wherein the modified sensor data generated from the generator model comprises at least one correction of the particular defect from the input first sensor data.

* * * * *